May 6, 1969        J. J. KUPCHICK        3,442,520
BEARING SEAL
Filed Aug. 2, 1967
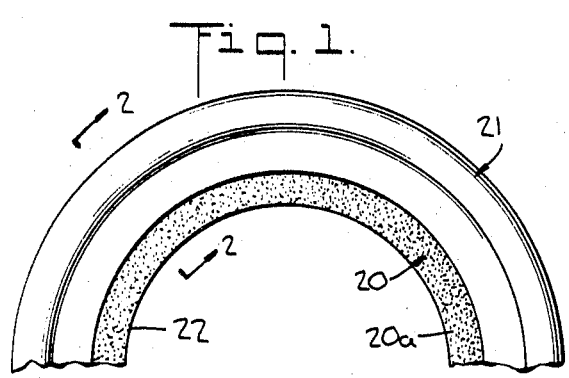
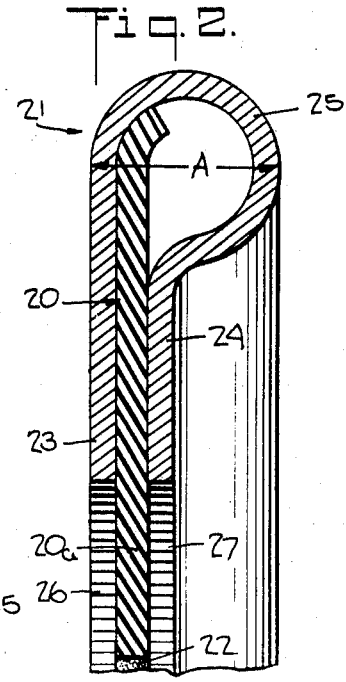
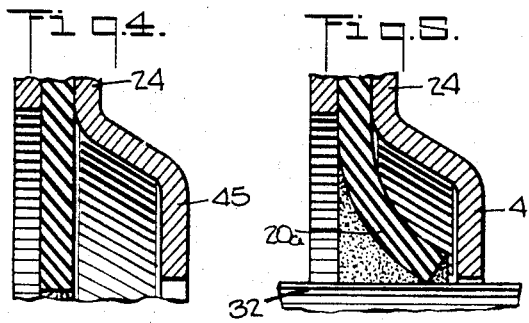
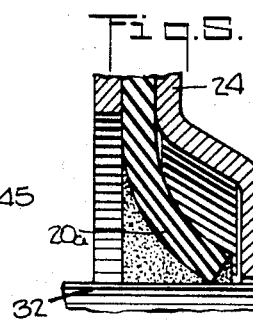
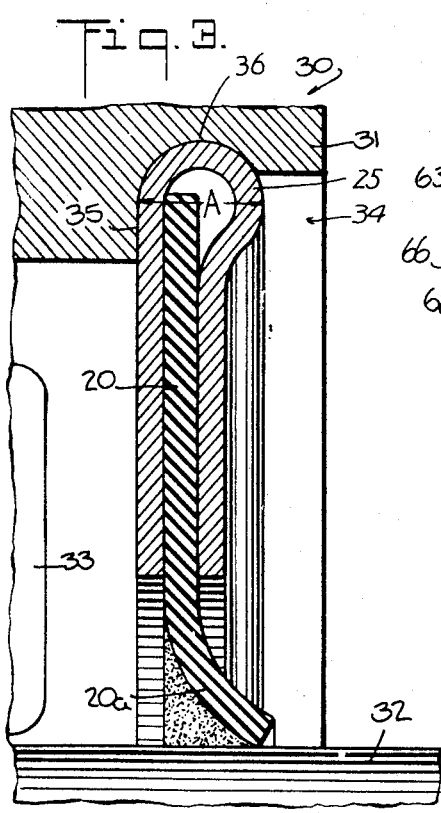
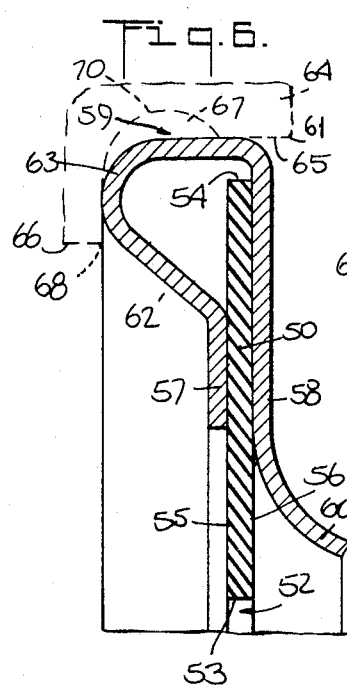
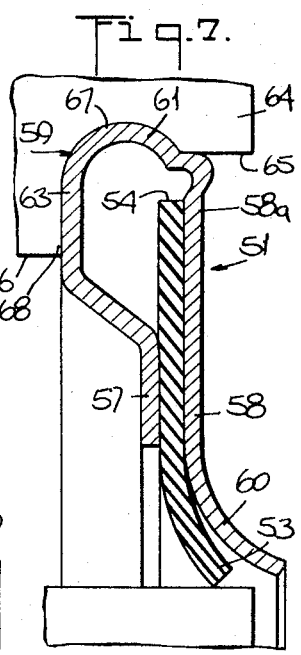
INVENTOR.
JOHN J. KUPCHICK
BY George C. Bower
ATTORNEY United States Patent Office 3,442,520
Patented May 6, 1969

3,442,520
BEARING SEAL
John J. Kupchick, Forestville, Conn., assignor to
TRW Inc., Euclid, Ohio, a corporation of Ohio
Continuation-in-part of application Ser. No. 538,888,
Feb. 14, 1966. This application Aug. 2, 1967, Ser.
No. 657,926
Int. Cl. F16j *15/00, 9/00;* F16k *41/00*
U.S. Cl. 277—169                                    4 Claims

ABSTRACT OF THE DISCLOSURE

The bearing seal comprises a metal ring-shaped support and a flexible diaphragm for sealing bearings. The support is made of a dead soft metal and has a bead which is swaged or pressed to fit in a circular groove in the bearing to mount the seal on the bearing.

Related applications

This is a continuation-in-part of my copending application Ser. No. 538,888 filed on Feb. 14, 1966, and entitled, "Bearing Seal," which is a division of my application Ser. No. 320,690, filed Nov. 1, 1963, and entitled, "Method of Making a Bearing Seal" and now Patent No. 3,268,984 issued on Aug. 30, 1966.

Background of the invention

This invention relates to bearing seals and is directed particularly to the bearing seals of the annular flexible diaphragm type. It is directed particularly to the metal support for the sealing diaphragm and the mounting of the seal in one of the relatively rotatable members of a bearing.

In prior bearing seals the metal rings supporting the resilient or flexible diaphragms were made of steel having a springlike quality. The supporting rings were swaged into grooves in the outer rings of the bearings.

Summary of the invention

This invention is generally directed to the formation of the ring support of a dead soft metal so that the peripheral bead in the ring support can be deformed to fit and conform to a circumferential groove in the bearing.

An object of the invention is to provide an improved flexible diaphragm type seal that has a metal ring type support mounted in sealing relation in one member of a bearing and holding the flexible diaphragm in resilient sealing relation against the other member of the bearing.

Another object of the invention is to provide an inexpensive diaphragm type seal that is easily mounted in the bearing.

Another object of the invention is to provide an annular flexible diaphragm type of bearing seal that may be made from available materials.

Other and further objects of the invention will be apparent from the following description taken in connection with the drawings.

Brief description of the drawings

FIG. 1 is a full side view of an unmounted seal.

FIG. 2 is a fragmentary sectional view of the unmounted seal taken along lines 2—2 of FIG. 1.

FIG. 3 is a fragmentary sectional view of a bearing with antifriction elements with a fragmentary sectional view of the seal mounted thereon.

FIGS. 4 and 5 illustrate another embodiment with a diaphragm protector.

FIG. 6 is a fragmentary view of another embodiment of the seal taken along a section similar to one along lines 2—2 of FIG. 1.

FIG. 7 is a fragmentary sectional view of the seal shown in FIG. 6 mounted in a bearing.

Detailed description

Referring to FIGS. 1 and 2 of the drawings, a finished seal before mounting in the bearing is illustrated. This seal comprises a flexible diaphragm 20 of Buna "N" rubber and a ring-shaped metal support 21 of SAE 1010 dead soft steel. The rubber diaphragm 20 is circular in shape for fitting within the support 21 and has a central opening 22 for passing the other elements of the bearing or a shaft. The support 21 is formed as a single piece and essentially comprises a back flange 23, a front flange 24 and a bead 25, each extending circumferentially around the seal. The flanges 23 and 24 form circular openings 26 and 27, respectively, which are substantially greater than the opening 22 of the diaphragm. The diaphragm is positioned between the flanges 23 and 24 and extends radially inward to form a flexible portion 20a. The flanges 23 and 24 are pressed against the diaphragm to securely hold it in the metal support.

In FIG. 3 a bearing 30 is illustrated having an outer ring 31 and an inner ring 32 and antifriction elements 33. The outer ring 31 has a circumferentially extending notch 34 forming a circumferential radially extending wall 35. A groove 36 extends circumferentially and continuously to the wall 35 to form a sealing surface and for retaining the seal in the outer ring 31. The seal is positioned against the wall 35 and the bead 25 is swaged or spanked so that it is forced outwardly to recess in the groove 36. This locks the seal in the outer ring 31. As illustrated in FIG. 3 the swaging or spanking action reduces the diameter A of the bead 25. This action provides a positive locking of the seal and prevents rotation or displacement. The support 21 holds the diaphragm 20 so that the flexible portion 20a is curved to press against the inner ring 32 and form a seal therewith. The flexible portion 20a and the inner ring 32 may rotate relative to one another while maintaining the seal. The portion 20a may also be flexed inwardly towards the antifriction elements depending on whether the fluid pressure is applied from outside the bearing or from within the bearing.

The bead is easily pressed into an annular groove for a fixed support of the seal. Since the bead and flange 23 are circumferentially continuous a fluidtight seal is formed with the surface 35 and the surface of the groove 36 of the outer ring 31. The angular portion 20a of the diaphragm 20 forms a seal against the rotating inner ring 32. The bead 25 when forced into the annular groove 36 has a diameter reduced about one-fourth from the original diameter of the bead. The flange 24 also functions as a protector of the seal from damage.

In FIGS. 4 and 5 a modification of the seal is illustrated in which the front flange 24 is extended to form a protector 45 which extends circumferentially around the seal. The protector is angulated to provide space for the curved flexible portion 20a when the seal is bearing against the shaft 32.

The embodiment shown in FIGS. 6 and 7 comprises a flat flexible diaphragm 50 and a ring-shaped metal support 51. The diaphragm 50 is circular in shape with a central opening 52 defined by the inner edge 53, a peripheral outer edge 54 and sides 55 and 56. The ring-shaped support 51 comprises two flanges 57 and 58, and a bead 59. A protector 60 may be provided, if desired, to guard the diaphragm against impact by foreign articles. The protector extends circumferentially and is curved cross-sectionally, as illustrated, to accommodate the curve of the diaphragm on sealing against the inner ring as shown in FIG. 7.

The bead 59 comprises a radially extending wall 58a which is an extension of the flange 58, a cylindrical axially extending outer peripheral wall 61, a conical wall 62 extending at an angle from the flange 57 and rounded circumferentially extending wall 63 connecting the cylindrical wall 61 and the conical wall 62.

The diaphragm 50 is made of #2189 Buna "N" rubber. The ring support is made of SAE 1010 dead soft steel. The diaphragm and support are formed in the manner described in my Patent No. 3,268,984.

The outer ring 64 has an outer cylindrical surface 65 and an inner cylindrical surface 66. A rounded circularly formed groove 67 extending from the inner edge of surface 65 to the radially extending surface 68 receives the bead 59.

The cylindrical wall 61 has a smaller diameter than the diameter of the outer surface 65. The seal fits with the outer ring and the rounded wall 63 engages the radially extending surface 68. The seal is forced further in by a tool (not shown) engaging the flange 58 and wall 58a. The bead is deformed and the cylindrical wall 61 and portion of wall 63 is forced into the groove 67 and against the circular groove surface 70. A portion of the wall 61 engages the surface 65 and a portion of the wall 58a bends backwardly or axially as illustrated in FIG. 7.

The flanges 57 and 58 tightly grip the radial surfaces 55 and 56 of the diaphragm to hold the diaphragm while the seal is securely held by the bead fitting in the groove. The inner edge of the diaphragm engages the inner ring of the bearing as illustrated.

Thus the bead is pressed outwardly into the deformed shape to conform to the contour of the groove. The wall 61 may not seat completely against surface 70. Variations may occur depending on the size of the groove and outer ring.

The invention is set forth in the appended claims.

I claim:

1. A bearing seal comprising a radially extending resilient diaphragm having a central opening for passing a member rotatable in relation thereto, a single piece support of deformable dead soft metal having dead soft metal flanges gripping opposite sides of said diaphragm in intimate contacting relation over continuous radial and circumferential areas on a respective side, a circumferential portion of said diaphragm extending radially beyond said flanges for engaging a relatively rotatable member, said support having a circumferentially extending malleable dead soft metal bead supporting said flanges, said bead extending axially to one side of the radial plane of the flanges and being deformable radially outwardly and axially on pressing of said bead into a smaller annular groove in a ring member to conform thereto and hold said diaphragm in a sealing relation with a relatively rotatable member passing through said central opening.

2. A bearing seal as set forth in claim 1 wherein said bead has a generally triangular shaped cross-section forming the axial extension.

3. A bearing seal as set forth in claim 1 wherein said bead has an outer cylindrically shaped wall extending axially and circumferentially, an inner conically shaped wall and a rounded circumferentially extending wall connecting said cylindrically shaped wall and said conically shaped wall.

4. A bearing seal comprising a radially extending resilient diaphragm having a central opening for passing a member rotatable in relation thereto, a single piece support of deformable dead soft metal having dead soft metal flanges gripping opposite sides of said diaphragm in intimate contacting relation over continuous radial and circumferential areas on a respective side, a circumferential portion of said diaphragm extending radially beyond said flanges for engaging a relatively rotatable member, said support having a circumferentially extending malleable dead soft metal bead having an outer generally cylindrically shaped wall extending axially and circumferentially, an inner conically shaped wall connected to one of said flanges and extending toward said outer wall, a rounded circumferentially extending wall connecting said cylindrically shaped wall and said conically shaped wall and a radial wall on the opposite side of said resilient diaphragm connecting said other flange to said outer wall and said walls being deformable on pressing said bead against a ring member with a smaller annular groove to conform said outer wall thereto for holding said diaphragm in a sealing relation with a relatively rotatable member passing through said central opening.

References Cited

UNITED STATES PATENTS

| 857,134 | 6/1907 | Wilcox | 277—235 X |
|---|---|---|---|
| 2,157,995 | 5/1939 | Boyd | 277—184 |
| 2,530,052 | 11/1950 | Firth | 277—184 |
| 2,718,441 | 9/1955 | Smith | 277—184 |
| 2,902,300 | 9/1959 | Schultz | 277—169 |
| 3,071,385 | 1/1963 | Greiner | 277—94 |
| 3,206,829 | 9/1965 | Schaeffler et al. | 277—1 X |
| 3,241,846 | 3/1966 | Peickii | 277—169 X |

FOREIGN PATENTS

| 546,260 | 7/1942 | Great Britain. |
|---|---|---|
| 622,418 | 5/1949 | Great Britain. |

SAMUEL ROTHBERG, *Primary Examiner.*

U.S. Cl. X.R.

277—184